Sept. 1, 1953 J. E. LUNDBERG ET AL 2,650,502
BALANCING MEANS FOR FLOATED GYROSCOPES
Filed Nov. 30, 1949

Inventors:
John E. Lundberg,
Harry G. Swanson,
by Russell A. Warner
Their Attorney.

Patented Sept. 1, 1953

2,650,502

UNITED STATES PATENT OFFICE 2,650,502

BALANCING MEANS FOR FLOATED GYROSCOPES

John E. Lundberg, Lynn, and Harry G. Swanson, Belmont, Mass., assignors to General Electric Company, a corporation of New York Application November 30, 1949, Serial No. 130,118

6 Claims. (Cl. 74—5)

The present invention relates to arrangements for accurately balancing a movable device in its suspensions and, more particularly, to arrangements for eliminating net torques about the axes of rotation of the rotor housing unit of a floated gyroscope.

In the copending application of F. V. Johnson and F. R. Fowler, Serial No. 171,582, filed July 1, 1950, for "Floated Gyroscopes," assigned to the same assignee as that of the present application, there is disclosed a highly accurate directional gyroscope instrument wherein the rotor and motive and support means therefor are mounted in a sealed container of such proportions that it will just support itself within a surrounding liquid. One of the prime advantages realized by this flotation is that sensitive low-friction bearings may be utilized, in the absence of heavy loads, with a consequent reduction in the friction along the motor-to-vertical gimbal axis to a negligible quantity. It is also essential to the preservation of high accuracy in such an instrument that the unit comprised of the gyro rotor, motive means, and the liquid-tight spherical container for the rotor and motor means be neutrally balanced about the axes about which it pivots, such neutral balance being accomplished for both the mass and buoyancy of the unit. While compensation for those unbalances due to mass distributions may be efficiently accomplished by the shifting of positions of weights appropriately disposed about the pivotal axes of the unit, it is not possible to compensate satisfactorily for an unbalance in buoyancy by a change in mass distribution, and vice versa, since the balance which may be produced when the supporting liquid has a predetermined density will be entirely upset when this density changes, for example, with variations in temperature.

It is therefore one object of the present invention to provide a floated gyroscope instrument wherein the liquid-tight container including the gyro rotor structure may be neutrally balanced about its pivotal axes for all densities of the supporting liquid.

A second object is to provide a balancing means for a floated gyroscope which varies the buoyancy of a floated container without upsetting the mass balance thereof.

Additionally, it is an object to provide an adjustable bellows unit, for a container immersed in a fluid, which may compensate for unbalance of said container due to the buoyancy thereof without disturbing mass balance.

These and other objects and features of our invention may be most effectively observed with reference to the following description and the accompanying drawings, wherein.

Figure 1:
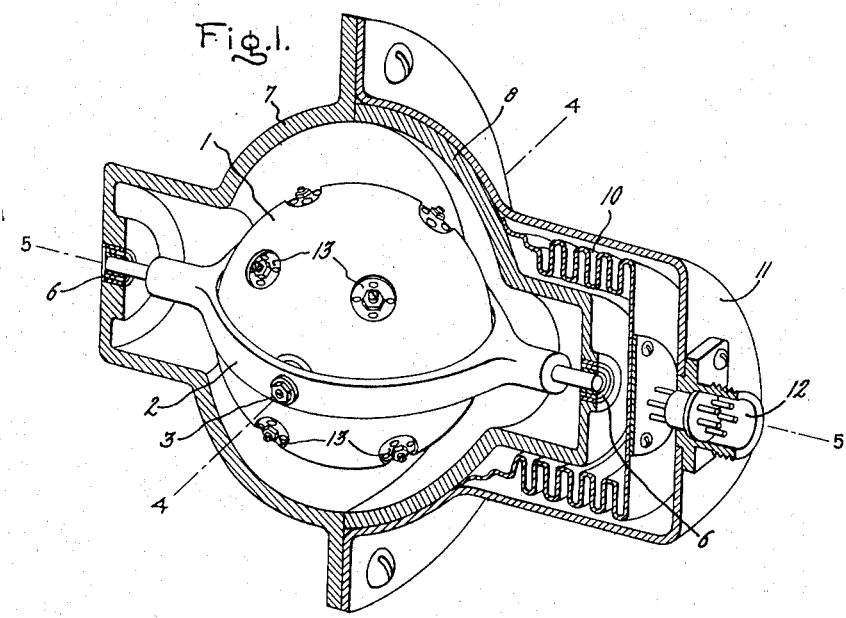
Fig. 1 is a pictorial side view, partially cut away along a longitudinal axis, of a floated gyroscope balanced in accordance with the present invention.

The floated directional gyroscope of Fig. 1, and of the copending application noted above, includes a gyro rotor and motive and support means therefor, not shown, mounted within a spherical shell or container 1 which is liquid-tight and which is pivotally supported by main gimbal 2 through trunnions 3. Universal freedom of movement of sphere 1 is permitted by virtue of its pivoting about minor axis 4—4 through trunnions 3 and by virtue of the pivoting of the supporting gimbal 2 about the major axis 5—5 on bearing 6. The entire structure as thus far described is housed and mounted within the partially spherical liquid-tight enclosure comprised of two joined sections 7 and 8. That volume intermediate the outer enclosure and those elements internal thereto is completely filled with a liquid 9 which buoys the spherical container 1, the dimensions of the container and the properties of the liquid being selected such that the container just displaces a volume of liquid equivalent to its mass, and the load on trunnions 3 is reduced to a minute value. Bellows 10 attached to section 8 is also filled with the liquid 9 which is free to pass between it and the interior of the enclosure of which this section forms a part, whereby expansion and contraction of the liquid is aided by a like effect on the bellows. The additional outer shell 11 superimposed over enclosure section 8 supports electrical connection apparatus 12 and physically protects the bellows 10. In this figure, a bellows assembly 13 is illustrated in each octant of the spherical surface of container 1, and, as hereinafter described, each assembly is adjustable to vary the depth to which the liquid 9 will fill the bellows beyond the spherical surface while the effective center of mass of the bellows assembly itself remains undisturbed. The distribution of assemblies 13 illustrated permits balancing of buoyancy both about axis 4—4 and axis 5—5.

Figure 2:
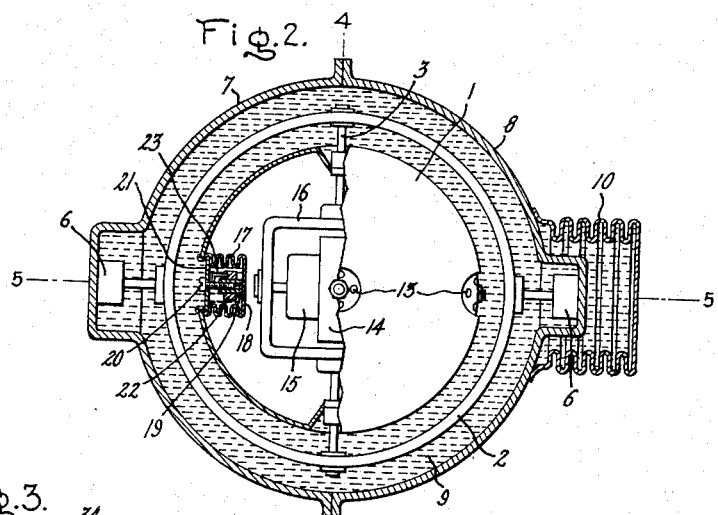
Fig. 2 is a pictorial top view, partially cut away along a longitudinal axis, of a floated gyroscope in which a cross section of a bellows balancing unit is shown on the rotor structure container.

The construction of a bellows compensator which may satisfy the requirements set forth in connection with the instrument of Fig. 1 is illustrated in Fig. 2 wherein corresponding elements of this gyroscope are assigned the same identifying numerals as those of Fig. 1. In the interior view of container 1, the gyro rotor 14, motive means 15, and supporting frame 16 are disclosed. Assembly 13 is shown to comprise an open-ended metal bellows 17 which is cylindrical in general appearance and which has a corrugated outer surface allowing longitudinal expansion and contraction thereof. One end of bellows 17 is sealed with the surface of sphere 1 proximately with a circular opening in this surface, and the opposite end is sealed with a mounting plate 18 upon which an internally- and externally-threaded member 19 is mounted to extend radially outward. The bolt 20 is threaded along a portion of its exterior to mesh with the interior of member 19 and, since bolt 20 is restrained from axial movements by a plate 21 disposed near the open end of the bellows and fixedly held by sphere 1, rotation of the bolt 20 by a screwdriver or wrench causes member 19, plate 18, and bellows 17 to move inwardly or outwardly, depending upon the direction of such rotation. Plate 21 may be perforated, as shown, or otherwise constructed or arranged to enable fluid 9 to fill the bellows chamber. An annular weight member 22, threaded on its interior, engages the threaded exterior of the member 19, and this weight is caused to rotate with bolt 20 by a pin 23 fastened to the bolt and making sliding axial engagement and tight radial engagement with the weight. The selections of threadings on the bolt 20, member 19, and weight 22 are such that rotation of bolt 20 in a direction which causes member 19 to move radially outward simultaneously results in a radially inward movement of weight 22, and vice versa, the net result of which is to maintain the center of mass of the entire balancing structure at substantially a predetermined position. In permitting the latter result, it is essential that weight 20 and the threading therefor be critically designed, such that, for any rotation of bolt 20, the shift in mass produced by movement of member 19, plate 18, and bellows 17 will be compensated by an equal and opposite shift of mass of weight 22. Thus, while bouyancy of the spherical container may be affected by variations in the depth of the bellows chamber, the balance of mass of the container remains unchanged and may be adjusted by other means independent of buoyant effects. It should be observed that only two pairs of diametrically opposed bellows balancing structures are disclosed in the embodiment of Fig. 2, since satisfactory gyro performance may be obtained when all torques due to buoyancy unbalance are eliminated about the sphere trunnion or minor gimbal axis.

Figure 3:
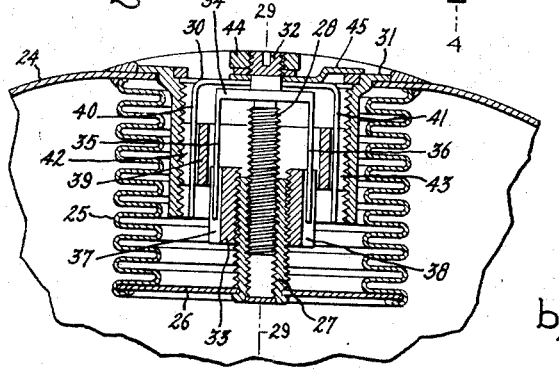
Fig. 3 depicts a preferred embodiment of a bellows unit for compensating buoyant effects on a floated structure and for compensating for shifts in its own mass when adjusted.

A detailed longitudinal cross-sectional view of a preferred balancing structure constructed in accordance with this invention is illustrated in Fig. 3 in association with a circular opening in the spherical container 24 of a floated gyro instrument. The substantially cylindrical bellows 25 is fastened at one end to container 24, as by soldering, and at the opposite end to mounting plate 26, thus constituting a liquid-tight closure for the container opening. Hollow member 27, threaded both internally and externally, is rigidly mounted, at one end, on mounting plate 26 and is disposed such that the internal threads thereof engage the externally-threaded portion of the shaft 28 which is rotatable about the central axis 29 of the balancing assembly. Plate 30, which is positioned by the bracket 31 soldered to container 24, serves to properly align the shaft 28 and to aid in restraining axial movements of this shaft. Therefore, rotation of shaft 28, accomplished as by a screwdriver inserted in the end 32, causes greater or reduced engagement between the threaded shaft portion and member 27 and a consequent expansion or contraction of the container due to buoyancy.

Simultaneously with a variation in the bellows length there would occur a shift in the center of a mass of the unit and the container onto which it is attached. To preclude this occurrence, a weight 33 is shifted in position to just compensate for whatever disturbance in the center of mass might otherwise ensue. This weight is preferably a hollow cylindrical element threaded internally and meshed with the exterior of member 27. Rotation of the weight is accomplished by a yoke 34 affixed to shaft 28 and having arms 35 and 36 which bear against the sides of openings 37 and 38, respectively, in weight 33 to impart the rotative motion. The threadings between weight 33 and member 27 and between member 27 and shaft 28 are selected such that weight 33 moves in a direction opposite to that of member 27 when shaft 28 is rotated and moves an amount sufficient to maintain the center of mass of the unit at a predetermined position. It is therefore possible to accomplish a balancing of the mass of the entire rotor structure and its container independently of the balancing of the bellows units, the latter balancing operation being reserved until the gyro is immersed in the supporting liquid. The arrangement of Fig. 3 is also inclusive of means for balancing the mass of the container, such means being recessed in the bellows chamber and eliminating projections above the spherical outer container surface. This latter means includes a hollow cylindrical weight 39 threaded on its exterior and engaging the threaded interior of the bracket 31 which is shaped to extend into the bellows chamber. Rotation of weight 39 to produce a shift in center of mass is achieved by rotation of plate 30 which bears two inwardly extending projections 40 and 41 disposed to contact the sides of openings 42 and 43, respectively, in weight 39. Plate 30 is rotatable independent of the shaft 28 and may be moved by any convenient device. When adjustment of the bellows and weights has been completed, lock nut 44 may be tightened, thereby clamping shaft 28 to plate 30 and plate 30, in turn, to bracket 31 because of the stiffly resilient arm 45 which frictionally holds the bracket in position with plate 30. The structure illustrated in Figure 3 is, of course, constructed to permit fluid to fill the bellows chamber.

It should be apparent that the present invention is susceptible of modification in numerous ways without departure from the spirit or scope thereof. By way of illustration, it is contemplated that the bellows balancing units may be disposed on the outside of a container, that any satisfactory number of such units may be employed, and that the distribution of such units may be varied to satisfy particular requirements. To those versed in the art, it will be obvious that mechanical structures for rotating the weights and arranging the components of the balancing units in operative relationship may be replaced by other known structures with equivalent results.

While particular embodiments of the subject invention have been shown and described herein, these are in the nature of description rather than limitation, and it will occur to those skilled in the art that various changes, modifications, and combinations may be made within the province of the appended claims and without departing either in spirit or scope from this invention in its broader aspects.

What we claim as new and desire to secure by Letters Patent of the United States is:

1. In combination with a floated gyroscope instrument having a liquid-tight substantially spherical housing for the gyro rotor structure thereof immersed in a liquid, a buoyancy balancing device comprising an expansible and contractile bellows member extending inwardly of the outer surface of said housing, said member being closed at one end and being sealed in liquid-tight relationship with said housing at another open end disposed opposite an opening in said housing through which said liquid fills said bellows member, an internally-threaded member affixed to said one end of said bellows member, an externally-threaded rotatable shaft engaging said internally-threaded member, and means supported by said housing for preventing axial movement of said shaft, whereby rotation of said shaft varies the axial length of said bellows and changes the balance of said housing and rotor structure due to buoyancy.

2. In combination with a floated gyroscope instrument having a liquid-tight substantially spherical housing for the gyro rotor structure immersed in a liquid, a buoyancy balancing device comprising an expansible and contractile bellows member extending inwardly of the outer surface of said housing, said member being closed at one end and being sealed in liquid-tight relationship with said housing at another open end disposed opposite an opening in said housing through which said liquid fills said bellows member, an internally- and externally-threaded member affixed to said one end of said bellows member, an externally-threaded rotatable shaft engaging the internal threading of said threaded member, means supported by said housing for preventing axial movement of said shaft, an internally-threaded weight member engaging the external threading on said threaded member, and means rotatable with said shaft for rotating said weight member simultaneously with said shaft, the threading on said threaded member, shaft and weight member being such that rotation of said shaft produces movement of said weight member and said threaded member in opposite axial directions.

3. The combination as set forth in claim 2 further comprising an internally-threaded cylindrical member connected to said housing and extending into the interior of said bellows member, and an externally-threaded weight engaging the threading on said cylindrical member, said weight being rotatable independently of the rotation of said shaft and together with said means for preventing shaft movement.

4. An adjustable bellows having a fixed center of mass with reference to a support comprising an expansible and contractile bellows member closed at one end and attached to said support at another end, an internally- and externally-threaded member non-rotatably affixed to said one end of said bellows member, an externally-threaded rotatable shaft engaging the internal threading of said threaded member, means connected with said support for preventing axial movement of said shaft, an internally-threaded weight member engaging the external threading on said threaded member, and means rotatable with said shaft for rotating said weight member simultaneously with said shaft, the threading on said threaded member, shaft and weight member being such that rotation of said shaft produces movement of said weight member and said threaded member in opposite axial directions.

5. In combination with a floated gyroscope instrument having a liquid-tight substantially spherical housing for the gyro rotor structure immersed in a liquid, a buoyancy balancing device comprising an expansible and contractile bellows member extending inwardly of the outer surface of said housing, said member being closed at one end and being sealed in liquid-tight relationship with said housing at another open end disposed opposite an opening in said housing through which said liquid fills said bellows member, a weight positioned within said bellows member, and means coupled with said housing, weight, and said one end of said bellows member for simultaneously moving said weight and said end of said bellows member in opposite directions with reference to said housing.

6. A buoyancy balancing arrangement for a liquid-tight container immersed in a liquid including a plurality of bellows balancing units disposed about the surface of said container, each of said units comprising an expansible and contractile bellows member extending inwardly of the outer surface of said container, said member being closed at one end and being sealed in liquid-tight relationship with said container at another end disposed opposite an opening in said housing through which said liquid fills said bellows member, a weight positioned within said bellows member, and means coupled with said container, weight, and said one end of said bellows member for simultaneously moving said weight and said end of said bellows member in opposite directions with reference to said container.

JOHN E. LUNDBERG.
HARRY G. SWANSON.

References Cited in the file of this patent

UNITED STATES PATENTS

| Number | Name | Date |
| --- | --- | --- |
| 1,480,637 | Schuler | Jan. 15, 1924 |
| 1,743,533 | Davis | Jan. 14, 1930 |
| 1,890,831 | Smyth | Dec. 13, 1932 |
| 2,307,590 | Kenyon | Jan. 5, 1943 |

FOREIGN PATENTS

| Number | Country | Date |
| --- | --- | --- |
| 150,452 | Great Britain | Sept. 9, 1920 |